(12) United States Patent
Kanekawa et al.

(10) Patent No.: US 7,277,816 B2
(45) Date of Patent: Oct. 2, 2007

(54) TIRE GRIP SENSOR AND CONTROL SYSTEM USING THE SENSOR

(75) Inventors: Nobuyasu Kanekawa, Hitachi (JP); Masatoshi Hoshino, Tsuchiura (JP); Kazuhiro Komatsuzaki, Hitachi (JP); Masayoshi Kaneyasu, Tokyo (JP)

(73) Assignees: Hitachi, Ltd., Tokyo (JP); Hitachi Cable, Ltd., Tokyo (JP)

( * ) Notice: Subject to any disclaimer, the term of this patent is extended or adjusted under 35 U.S.C. 154(b) by 17 days.

(21) Appl. No.: 11/196,298

(22) Filed: Aug. 4, 2005

(65) Prior Publication Data

US 2006/0069523 A1 Mar. 30, 2006

(30) Foreign Application Priority Data

Sep. 30, 2004 (JP) ............................ 2004-287557
Apr. 13, 2005 (JP) ............................ 2005-115553

(51) Int. Cl.
*G06F 19/00* (2006.01)

(52) U.S. Cl. .................... 702/145; 701/71; 701/74; 701/90; 73/146; 702/75

(58) Field of Classification Search ............... 702/145, 702/75; 701/62, 64, 74, 90, 95, 36, 73, 78, 701/70, 71; 73/146
See application file for complete search history.

(56) References Cited

U.S. PATENT DOCUMENTS 6,182,001 B1 * 1/2001 Sugai et al. .................. 701/78
6,385,553 B1 * 5/2002 Naito et al. .................. 702/138
6,895,317 B2 * 5/2005 Yasui et al. .................. 701/36

FOREIGN PATENT DOCUMENTS

| JP | 08-132831 A | 5/1996 |
| JP | 10 002813 A | 1/1998 |
| JP | 2001-004650 A | 1/2001 |

OTHER PUBLICATIONS

Kent Seki et al. (Analysis of wavelet correlation between tyre sounds and tread patterns), 0-7803-8812-7/05 c2005 IEEE, pp. 241-246).*
Katsuhiro Asano, et al., "Wheel Vibration Phenomenon and Braking Force Maximization Control", Toyota Central R&D Labs., Inc., R&D Review, vol. 34, No. 2, 1999.6.

* cited by examiner

*Primary Examiner*—John Barlow
*Assistant Examiner*—Hien Vo
(74) *Attorney, Agent, or Firm*—Crowell & Moring LLP

(57) ABSTRACT

A system for directly measuring tire grip conditions is provided which can measure a skidding condition with no need of applying a vibration. A tire rotation speed sensor comprising a detection gear and a magnet sensor is mounted to a rotating shaft of a tire. An output of the tire rotation speed sensor is analyzed in time-frequency domain to detect vibrations caused by slips, thereby determining tire grip conditions, such as a slip ratio and a slip angle. By detecting fluctuations in rotation based on the cause-effect relation between the occurrence of tire slips and the occurrence of fluctuations in rotation, the tire slips can be directly detected. Therefore, the tire grip conditions can be confirmed with high accuracy.

14 Claims, 21 Drawing Sheets

TIRE GRIP SENSOR AND CONTROL SYSTEM USING THE SENSOR

BACKGROUND OF THE INVENTION

1. Field of the Invention

The present invention relates to a tire grip sensor, and more particularly to a highly reliable control system suitable for detecting a tire grip.

2. Description of the Related Art

In addition to known passive safety techniques, active safety techniques have been developed for the purpose of reducing traffic accidents. The active safety techniques include an ABS (Antilock Braking System), a technique for detecting a collision and alleviating injury, a technique for stabilizing a vehicle, and control for braking, driving and steering with an X-by-Wire system.

To realize those active safety techniques, it is essential to detect a tire grip (frictional) force. As one of known methods for detecting tire grip conditions while a vehicle is running, Patent Reference 1; JP-A-2001-4650, for example, discloses a method of determining an estimated value based on a steering angle, a yaw rate sensor, etc. Another method of directly determining a gradient of frictional forces from a change in resonance gain of a tire-body system is proposed in Non-Patent Reference 1; Katsuhiro Asano, et al., "Wheel Vibration Phenomenon and Maximization Control of Braking Force", Toyota Central R&D Labs., Inc., R&D Review Vol. 34, No. 2, 1999.6, (http://www.tytlabs.co.jp/japanese/review/rev342pdf/342_027a sano.pdf), Patent Reference 2; JP-A-10-2813, and Patent Reference 3; JP-A-8-132831.

SUMMARY OF THE INVENTION

Among those known techniques, the estimation method represented by JP-A-2001-4650 is disadvantageous in that an estimation error is included due to fluctuation factors, such as road environment parameters. With view of avoiding such an estimation error, a first object of the present invention is to provide a system for directly measuring tire grip conditions.

The method disclosed in JP-A-10-2813 is free from the estimation error because it directly measures tire grip conditions. However, the disclosed method still has room for improvement for the reasons that the method cannot measure skidding of a tire and has the necessity of applying a vibration to a measurement target in order to measure a resonance condition. When a control target is limited to the ABS control, a vibration is applied with the ABS operation and it is just required to detect a tire slip in the circumferential direction. When trying to perform overall vehicle stability control including steering control, however, a method capable of controlling a skidding condition as well with no necessity of applying a vibration by the ABS is demanded. Accordingly, a second object of the present invention is to provide a method capable of measuring a skidding condition as well with no necessity of applying a vibration.

The present invention achieves those objects as follows. Tire slips induce slip vibrations and generate fluctuations in tire rotation speed. By analyzing such fluctuations in tire rotation speed, tire grip conditions, i.e., a slip ratio and a slip angle, are obtained. In the present invention, therefore, the tire grip conditions, i.e., the slip ratio and the slip angle, are measured by mounting a tire rotation speed sensor, which comprises a detection gear and a magnetic sensor, to a tire rotating shaft or the like, analyzing an output of the tire rotation speed sensor in time-frequency domain, and detecting vibrations induced by slips.

As shown in FIG. 1, a vibration occurs when a tire slips. When a tire slips intermittently, it can be deemed that, as shown in FIG. 1, excitation energy corresponding to the product of a frictional force and a slip distance is applied to the tire in the form of an impulse for a moment at the time of slipping, and vibrations 11 are generated intermittently at a resonance frequency in accordance with a frequency characteristic 10 of the tire and a driving system.

The tire slip is divided into a slip in the circumferential direction and a slip in the lateral direction (i.e., in the axial direction of the rotating shaft). The slip in the circumferential direction is represented by a slip ratio, and the slip in the lateral direction is represented by a slip angle. According to Reference Document 1 (Hideo Sakai, "Tire Engineering", Grand Prix Publishing Co., Ltd, (1987)), the resonance frequency in the circumferential direction of a tire is expressed by;

$$f_{oth} = \sqrt{\{3ks + (kt+kr)w2/4r2\}/3m]}2\pi$$

where ks: spring constant in the lateral direction,
kt: spring constant in the circumferential direction,
kr: spring constant in the radial direction,
w: belt width, r: radius, and m: mass.

Then, the resonance frequency in the circumferential direction is calculated as being about 80 Hz. Also, the resonance frequency in the lateral direction is expressed by;

$$f_{ox} = \sqrt{(4(2kt+kr)/3m\pi)}/2\pi$$

and is calculated as being about 50 Hz.

Because vibrations caused by circumferential slips each represented by a slip ratio occur in the circumferential direction, they become directly circumferential vibrations, i.e., fluctuations in tire rotation speed. On the other hand, vibrations caused by lateral slips each represented by a slip angle do not become directly circumferential vibrations, i.e., fluctuations in tire rotation speed, but they change a ground contact condition of the tire and hence act to modulate the circumferential vibrations caused by the slips in the circumferential direction, as shown in FIG. 2. Accordingly, a circumferential vibration 11' after the modulation contains not only a component of the circumferential vibration having the frequency foth and caused by the slip in the circumferential direction, but also components of frequencies foth+foy and foth−foy generated with modulation resulting from the lateral vibration of the frequency foy caused by the slip in the lateral direction. Note that the lateral vibration of the frequency foy caused by the slip in the lateral direction occurs in a perpendicular direction and hence it is not contained in the circumferential vibration 11' after the modulation.

Although the above description is simplified by assuming a tire to resonate at a single frequency for the sake of brevity, it can be deemed that there occurs a more complicated phenomenon in practice because a plurality of resonance points exist for each of the tire and the driving system, and the tire is further caused to resonate at higher harmonics and to vibrate at other frequencies with rolling of the tire. Anyway, as described above, the slip in the lateral direction affects the circumferential vibration of the tire in orthogonal relation, i.e., fluctuations in rotation, and both the slips in the circumferential and lateral directions affect the components of different frequencies.

According to the present invention, tire slips can be directly detected by detecting fluctuations in rotation based on the cause-effect relation between the occurrence of the tire slips and the occurrence of the fluctuations in rotation. Therefore, a system for directly measuring tire grip conditions is provided which can measure a skidding condition and confirm the tire grip conditions at high accuracy with no need of applying a vibration.

DESCRIPTION OF THE PREFERRED EMBODIMENTS

Embodiments of the present invention will be described below with reference to the drawings.

Figure 3:
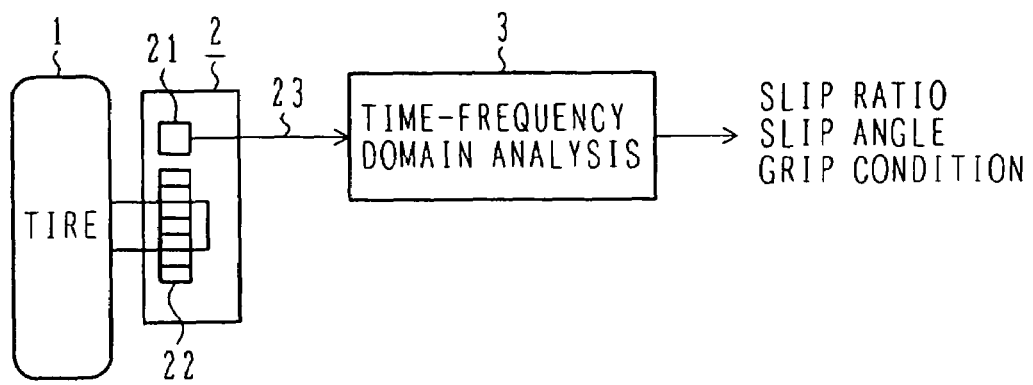
FIG. 3 is a block diagram showing a basic embodiment of the present invention.

FIG. 3 shows a basic embodiment of the present invention. A tire rotation speed sensor 2 comprising a detection gear 22 and a magnetic sensor 21 is mounted to a rotating shaft of a tire 1, and an output 23 of the tire rotation speed sensor 2 is subjected to a time-frequency domain analysis 3, to thereby determine tire grip conditions, i.e., a slip ratio and a slip angle. The time-frequency domain analysis 3 can be executed in a dedicated processing unit or in a control unit for an ABS (Antilock Braking System) or a VSC (Vehicle Stability Control) system in a shared manner.

Figure 4:
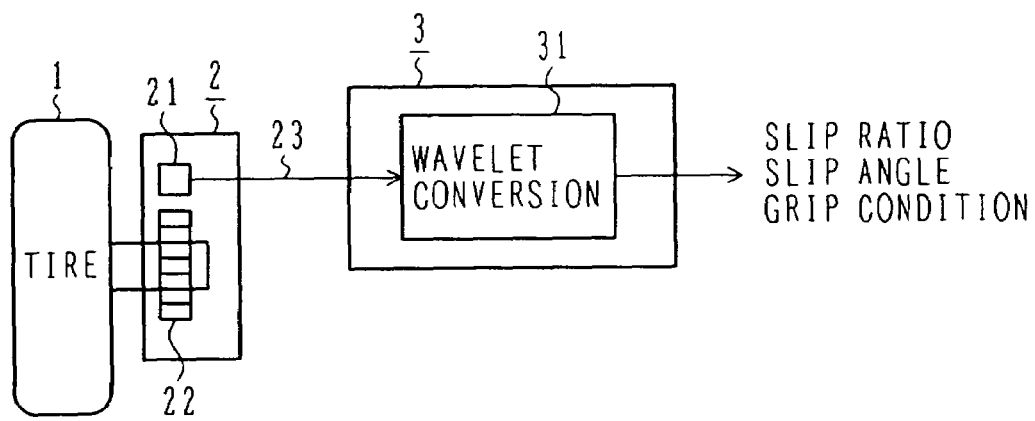
FIG. 4 is a block diagram showing an embodiment using Wavelet conversion.
Figure 6:
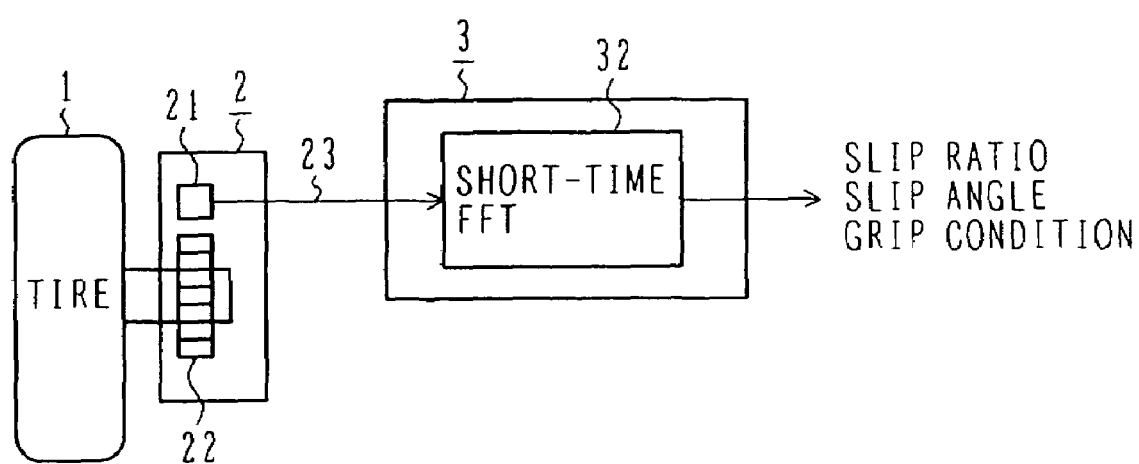
FIG. 6 is a block diagram showing an embodiment using short-time FFT.

Because vibrations are generated by slips in a way not continuous but intermittent, the time-frequency domain analysis 3 can be executed, for example, using Wavelet conversion 31 shown in FIG. 4 or short-time FFT (Fast Fourier Transform) shown in FIG. 6.

Figure 5:
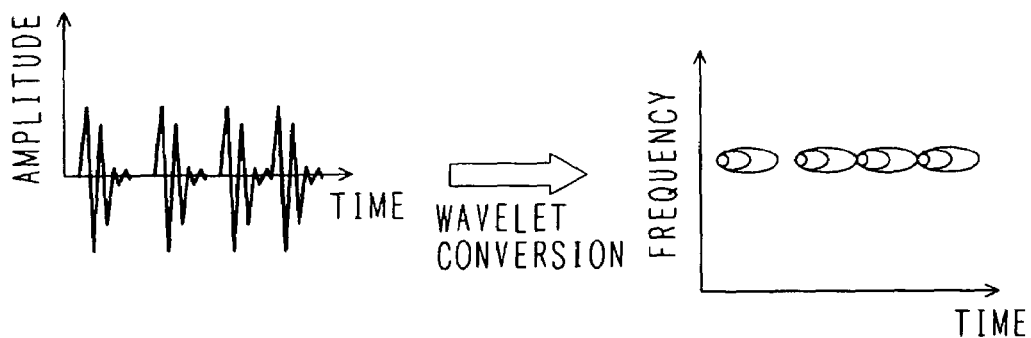
FIG. 5 shows an example of processing using the Wavelet conversion.

With the Wavelet conversion 31, an intensity distribution in the time-frequency domain, shown in the right side of FIG. 5 is obtained from a waveform in the time domain, shown in the left side of FIG. 5. In the right side of FIG. 5, the intensity distribution in the time-frequency domain is shown as contour lines with the vertical axis representing frequency and the horizontal axis representing time.

The short-time FFT 32 means a process of executing FFT on a part of sampled data while sequentially shifting a range to which the FFT is applied. As with the Wavelet conversion 31, the short-time FFT 32 can also provide a frequency distribution with respect to time.

Figure 7:
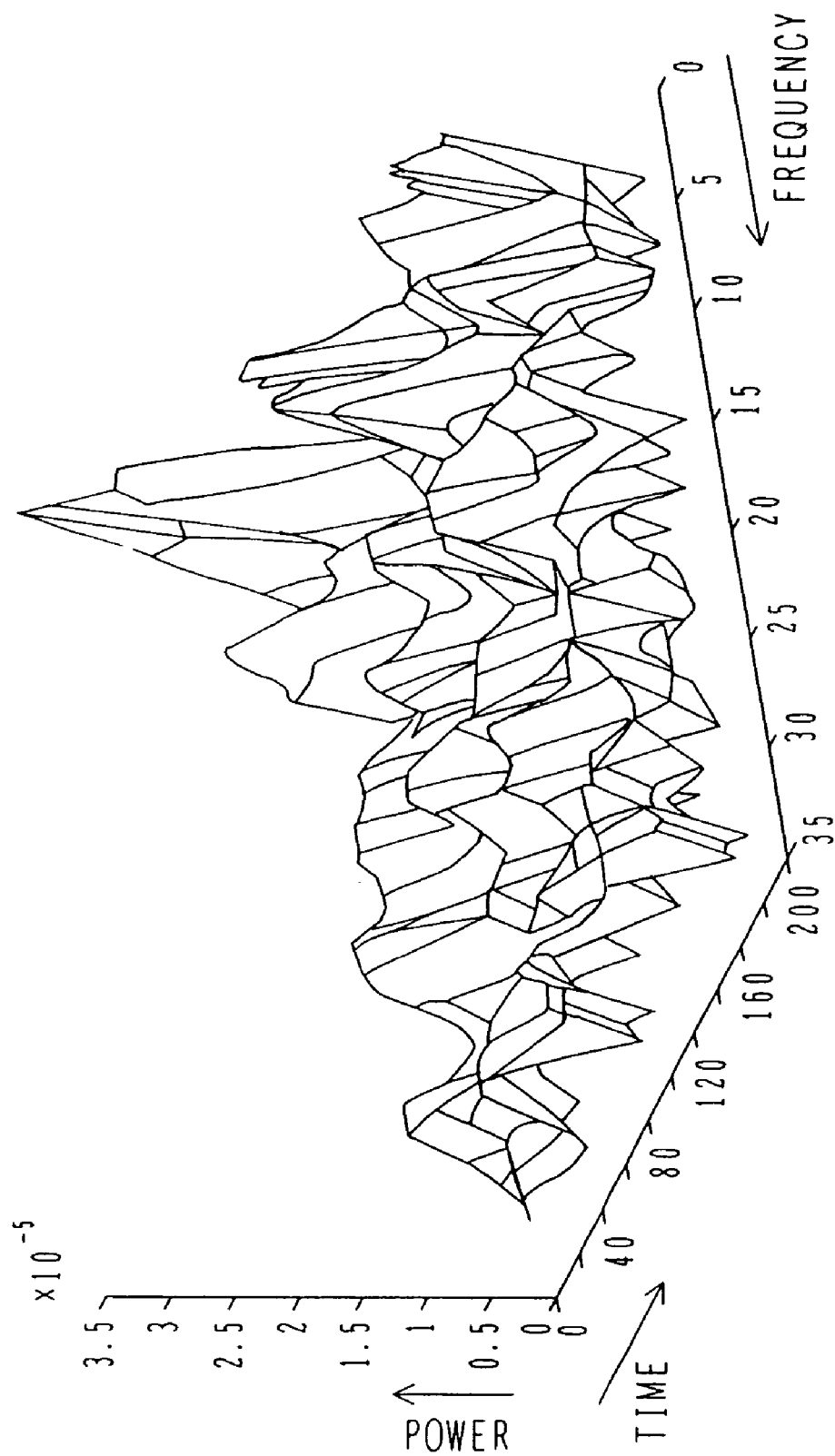
FIG. 7 is a graph showing a result of the short-time FFT in the embodiment of FIG. 6.

FIG. 7 is a graph showing a result of the short-time FFT actually executed on the output of the tire rotation speed sensor. This graph is obtained by projecting, to a two-dimensional plane, a three-dimensional representation of power with respect to time and frequency. As seen from FIG. 7, the frequency distribution is not steady, but it is changed with time. As a matter of course, a similar result can also be obtained with the Wavelet conversion 31.

Figure 8:
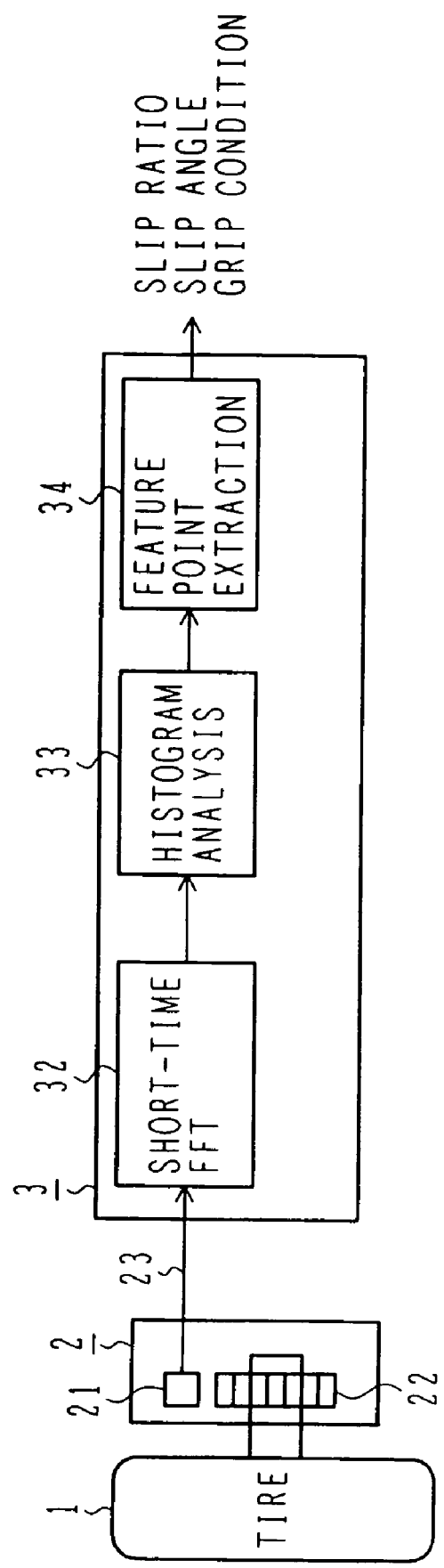
FIG. 8 is a block diagram showing an embodiment using the short-time FFT and a histogram analysis.

FIG. 8 shows an embodiment in which a histogram analysis 33 is executed after executing the short-time FFT 32 to determine the tire grip conditions, such as the slip ratio and the slip angle, with feature point extraction 34. It is also similarly possible to determine the tire grip conditions, such as the slip ratio and the slip angle, with feature point extraction 34 by executing the histogram analysis 33 after executing the Wavelet conversion 31.

Figure 9:
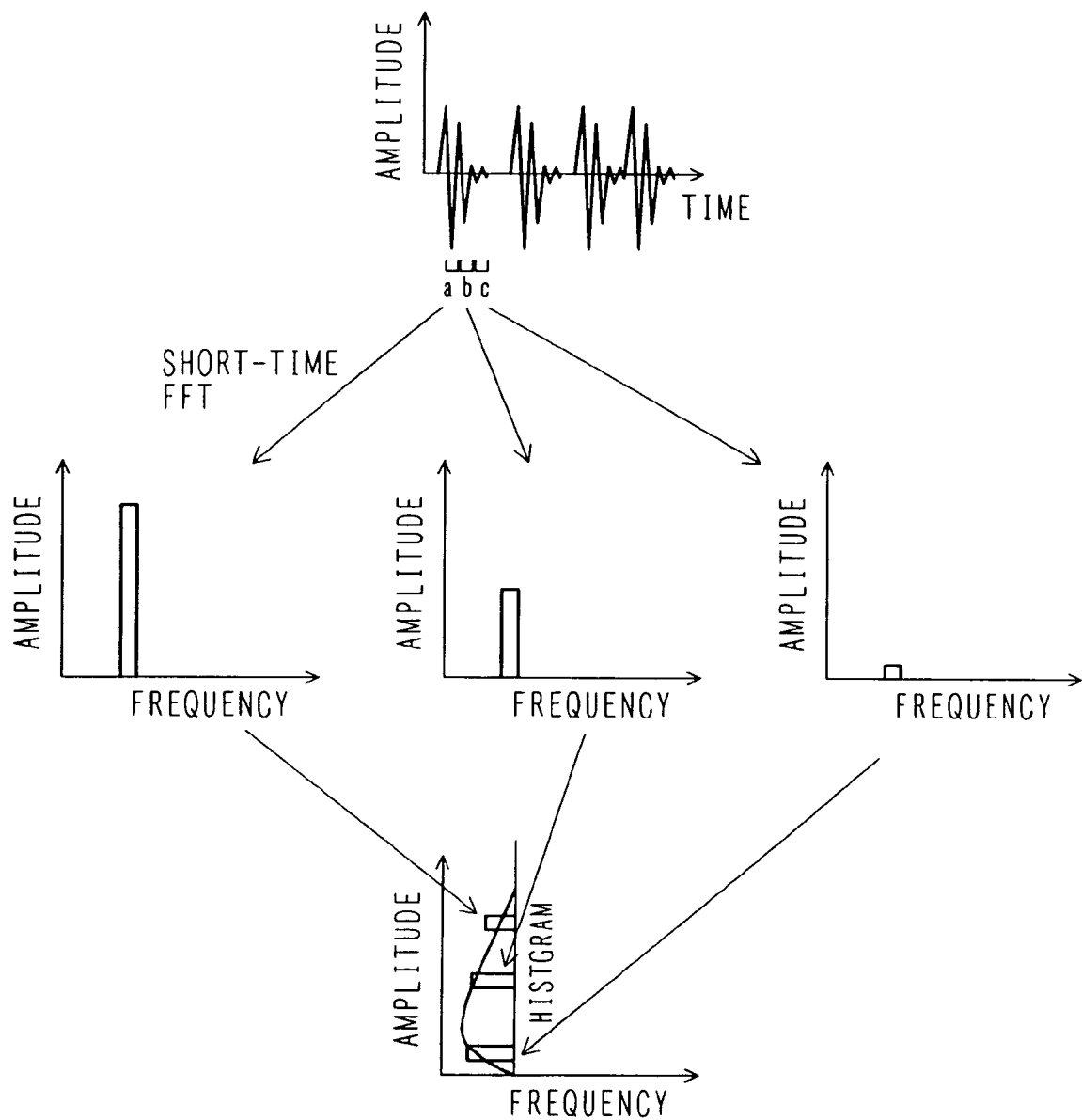
FIG. 9 shows a result of processing using the short-time FFT and the histogram analysis in the embodiment of FIG. 8.

As mentioned above, by executing the short-time FFT 32 on the input signal, the frequency distribution with respect to time is obtained. Looking at a particular frequency, the amplitude, i.e., energy, changes with time. The amplitudes resulting from the short-time FFT executed on data obtained in periods a, b and c in FIG. 9, for example, are changed as shown. Then, by executing the histogram analysis 33 to analyze those changes in terms of an incidence distribution with respect to the amplitude (energy), i.e., in the form of a histogram, it is possible to grasp a feature of vibrations intermittently caused by tire slips. More specifically, as a slip increases, the energy applied by the slip is increased and so is a distribution in the larger amplitude (energy) side of the histogram. Hence, information regarding the tire grip conditions, such as the slip ratio and the slip angle, can be obtained by extracting feature points of the histogram with the feature point extraction 34. The feature points to be extracted include, e.g., an average value of the distribution, a peak (most frequent value) of the distribution, the height of the peak (incidence of the most frequent value), and a slope at the foot of a distribution curve.

Figure 10:
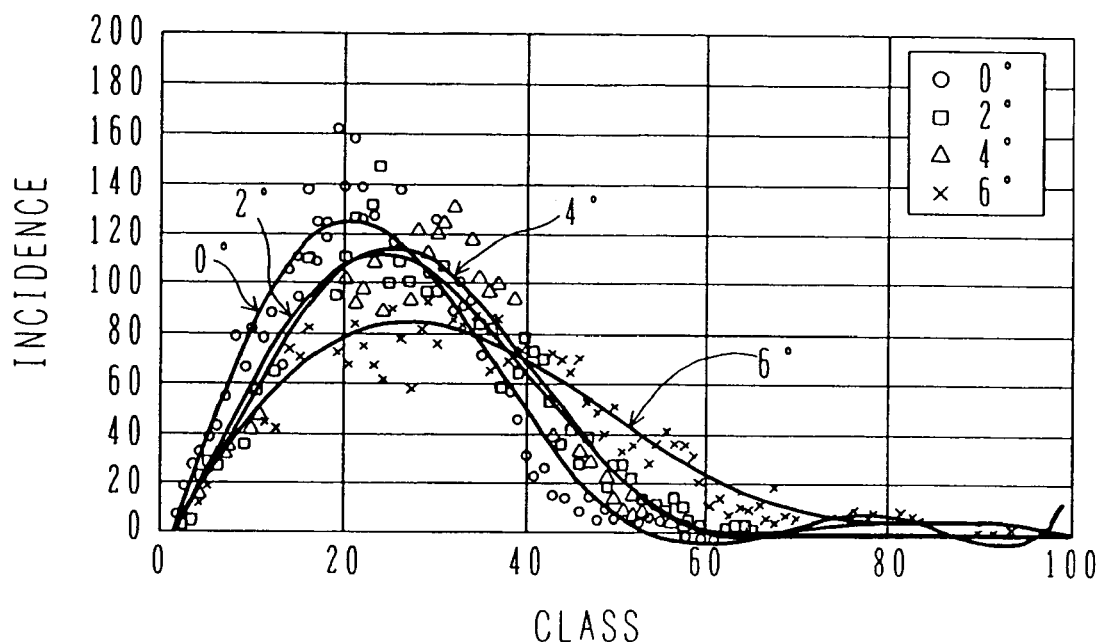
FIG. 10 is a graph showing one example of slip angle data in the embodiment of FIG. 8.
Figure 11:
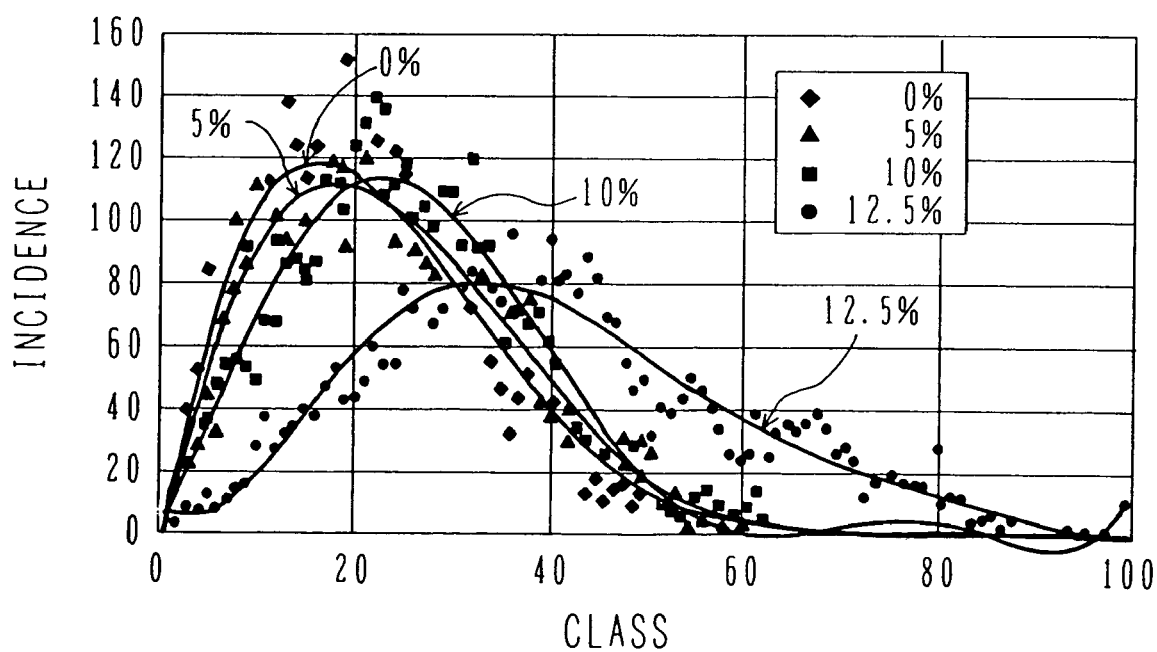
FIG. 11 is a graph showing one example of slip ratio data in the embodiment of FIG. 8.

FIGS. 10 and 11 show results obtained by executing the short-time FFT 32 and the histogram analysis 33 on actual experimental data by using the configuration shown in FIG. 8. FIG. 10 shows a histogram distribution at a frequency of 20 Hz for each value of the slip angle. Each plotted point represents an actually measured value, and a curve is resulted from fitting to a function of sixth degree with the method of least squares. It is seen from the graph of FIG. 10 that, in spite of the curves overlapping with one another to a large extent, a distribution in the larger amplitude (energy) side of the histogram is increased as the slip angle increases from 0° to 6°.

Figure 1:
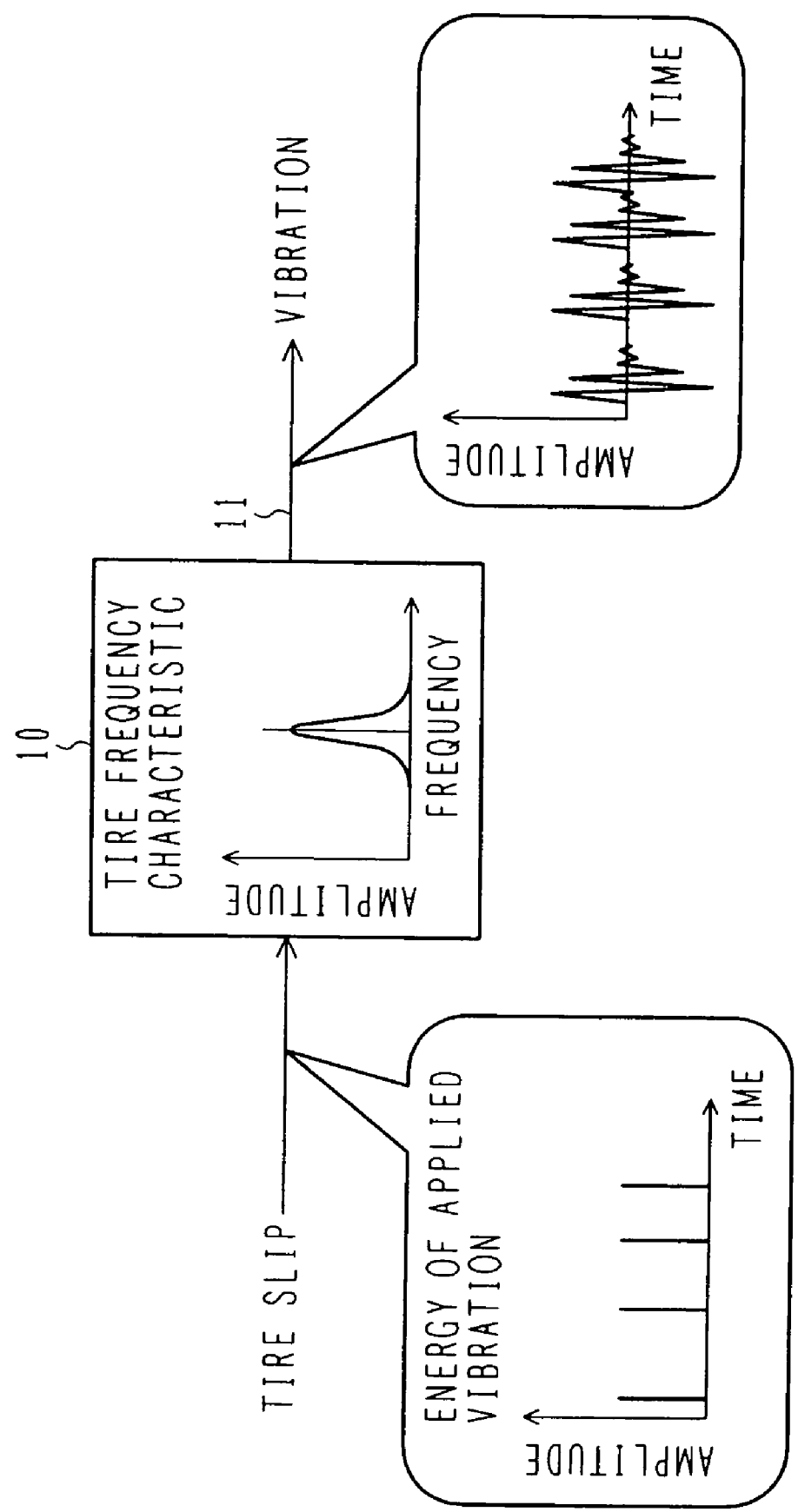
FIG. 1 is an illustration for explaining the principle of the present invention.
Figure 2:
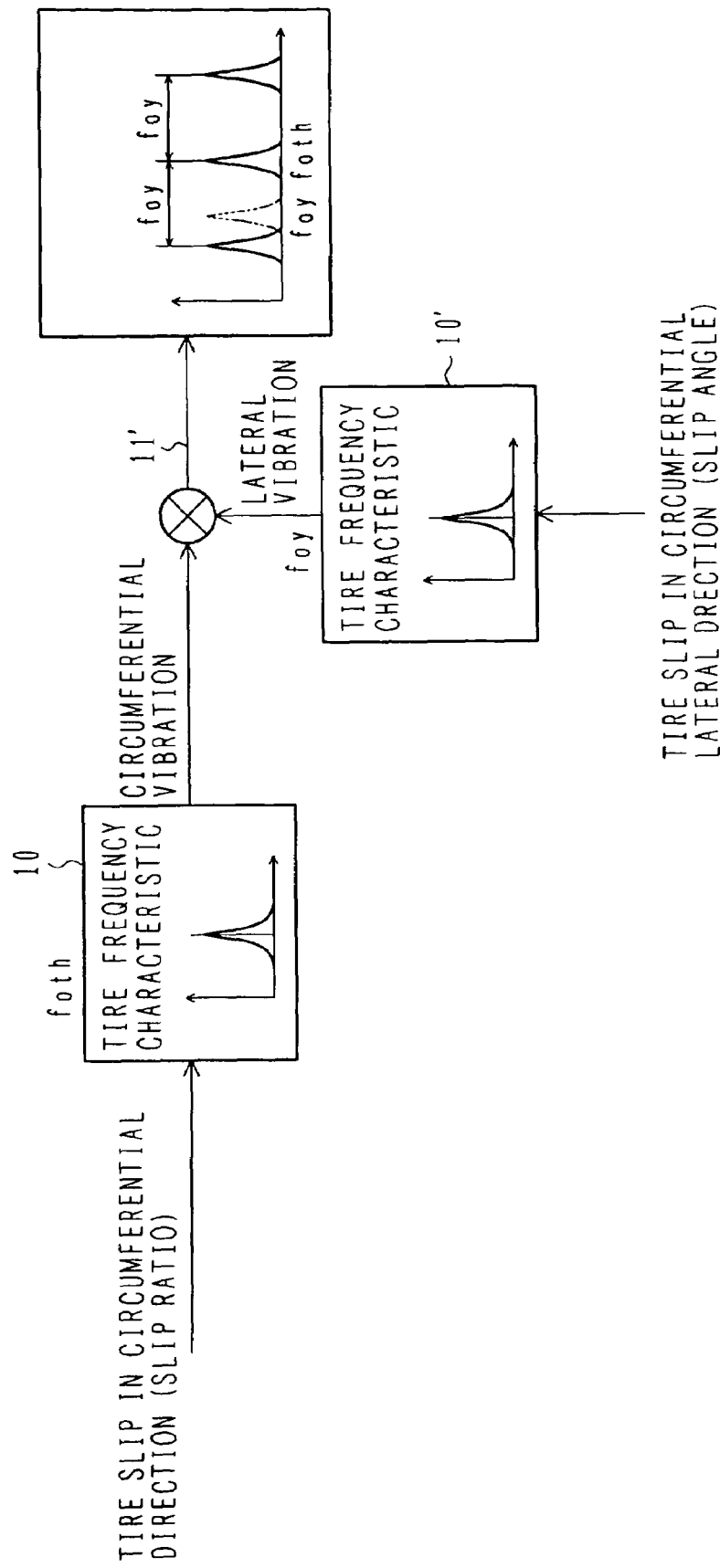
FIG. 2 is an illustration for explaining the principle of the present invention.

Such a dependence on the slip angle appears in the distribution at a relatively low frequency of 20 Hz to 50 Hz. This is presumably attributable to the fact that the slip angle does not directly generate a circumferential vibration, but it indirectly causes fluctuations in the rotation speed via an action of modulating the circumferential vibration, as shown in FIG. 2.

FIG. 11 shows a histogram distribution for each value of the slip ratio. As in FIG. 10, each plotted point represents an actually measured value, and a curve is resulted from fitting to a function of sixth degree with the method of least squares. It is seen from the graph of FIG. 11 that a distribution in the larger amplitude (energy) side of the histogram is increased as the slip ratio increases from 0% to 12.5%.

Such a dependence on the slip ratio appears in the distribution at a relatively high frequency of 80 Hz to 200 Hz.

Figure 12:
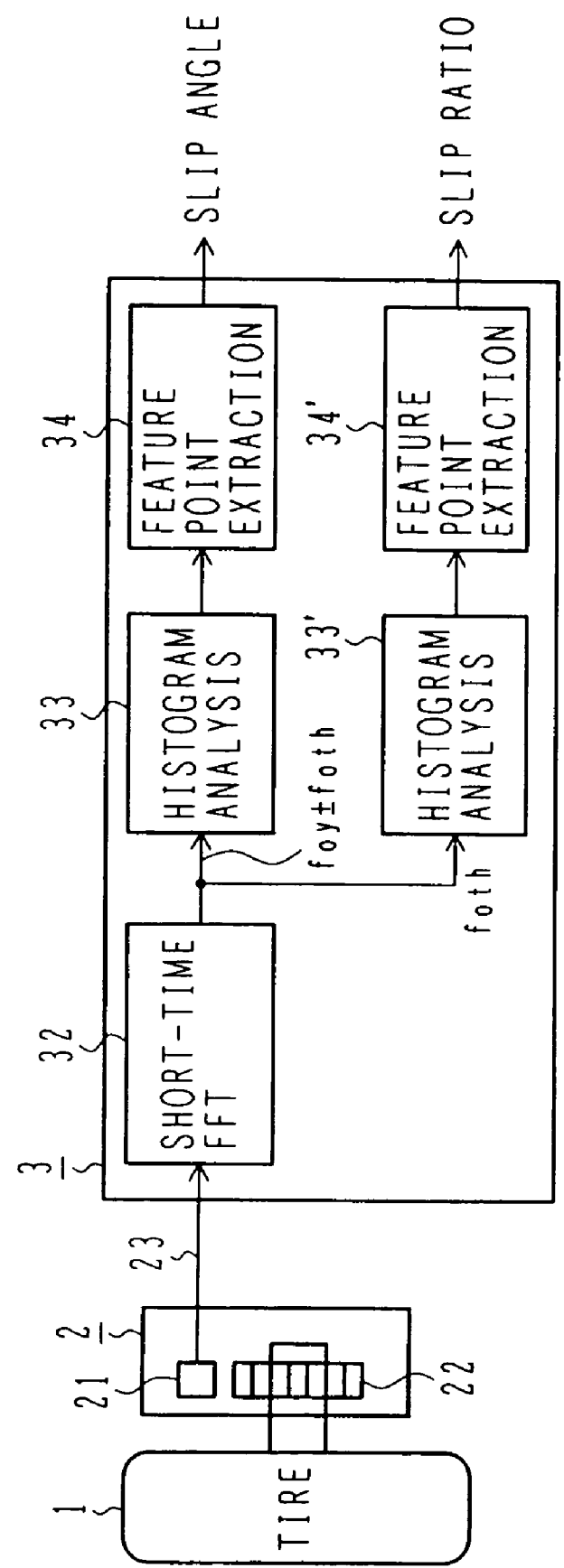
FIG. 12 is a block diagram showing an embodiment to execute processing using the short-time FFT and the histogram analysis.

As a result, information of the slip angle and the slip ratio can be obtained through the steps of, as shown in the embodiment of FIG. 12, executing the short-time FFT 32, then executing the histogram analyses 33, 33' at different frequencies, and extracting feature points with the feature point extractions 34, 34'.

According to the present invention, as described above, tire slips can be directly detected by detecting fluctuations in rotation based on the cause-effect relation between the occurrence of the tire slips and the occurrence of the fluctuations in rotation. Therefore, the tire grip conditions can be confirmed with high accuracy, and applications to vehicle stability control, etc. are expected.

Figure 13:
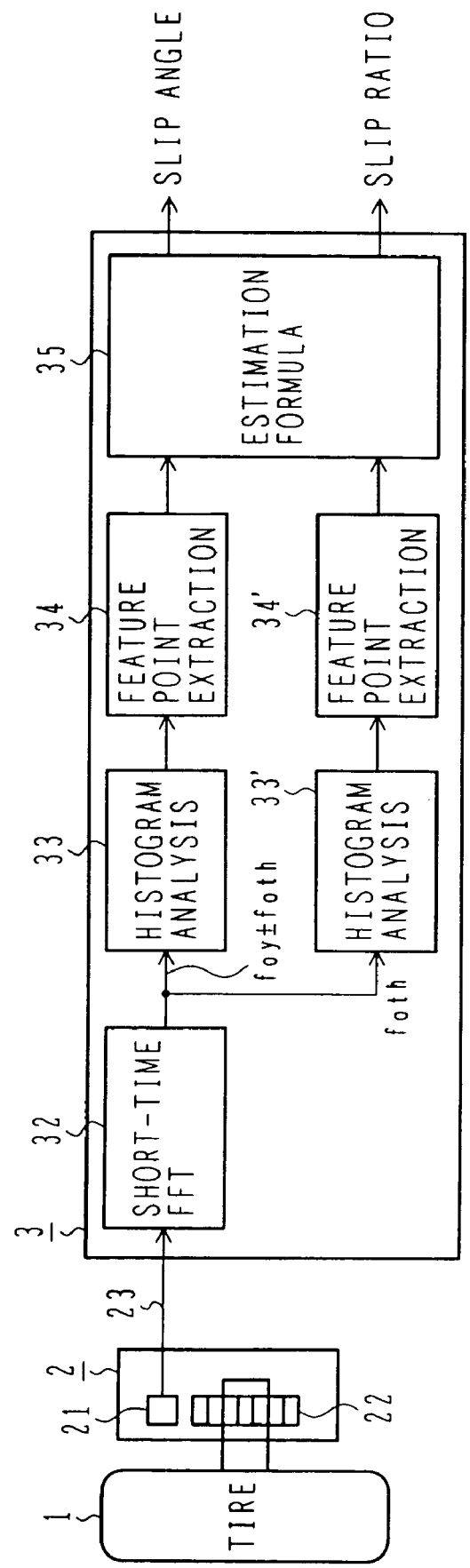
FIG. 13 is a block diagram showing an embodiment in which a slip angle and a slip ratio are estimated based on estimation formulae.

FIG. 13 shows an embodiment including the steps of executing the short-time FFT 32, then executing the histogram analyses 33, 33' at different frequencies, extracting feature points with the feature point extractions 34, 34', and estimating the slip angle and the slip ratio using an estimation formula 35 based on values representing the extracted feature points (such as an average value of the distribution, a peak (most frequent value) of the distribution, the height of the peak (incidence of the most frequent value), and a slope at the foot of a distribution curve). The estimation formula 35 is expressed by a polynomial expression of one or several orders containing those values (such as an average value of the distribution, a peak (most frequent value) of the distribution, the height of the peak (incidence of the most frequent value), and a slope at the foot of a distribution curve).

Figure 14:
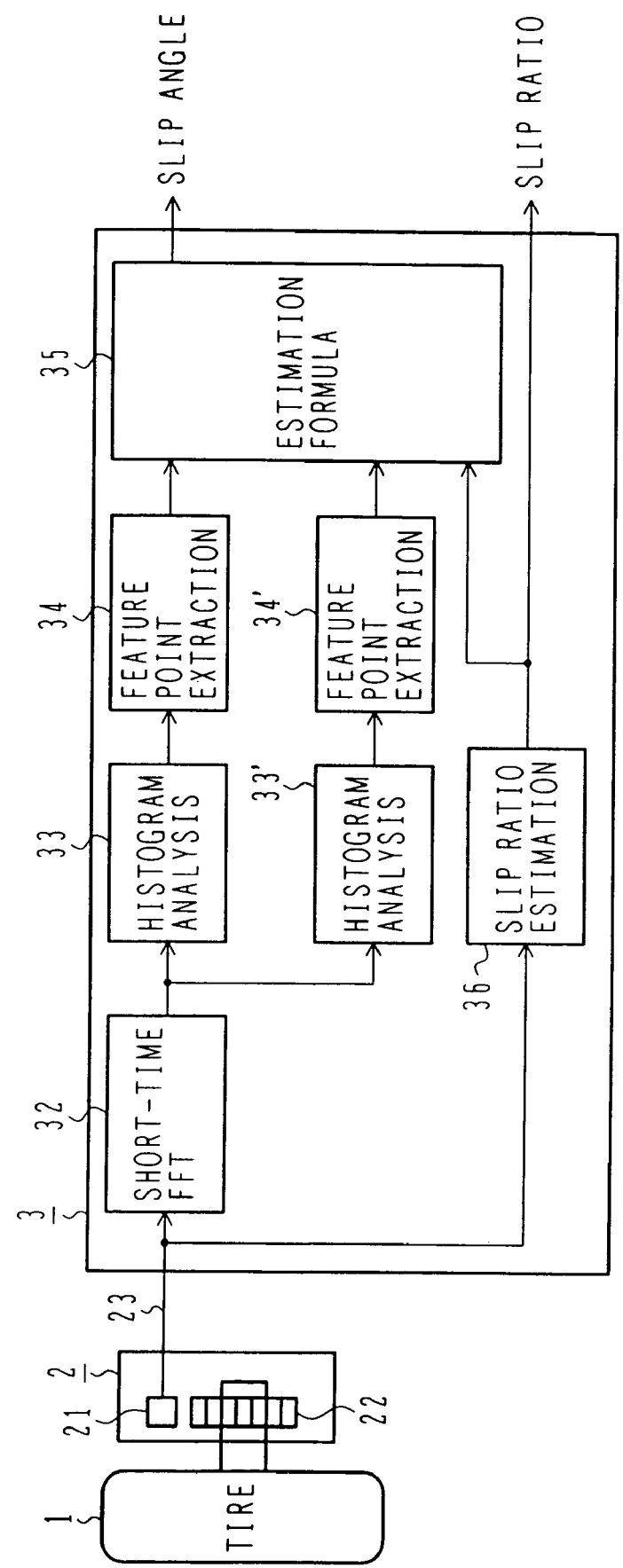
FIG. 14 is a block diagram showing an embodiment in which a slip angle is estimated based on an estimation formula from a slip ration that is estimated in accordance with another method.

FIG. 14 shows an embodiment further including the step of estimating the slip angle using the estimation formula 35 based on values representing the feature points extracted with the feature point extractions 34, 34' (such as an average value of the distribution, a peak (most frequent value) of the distribution, the height of the peak (incidence of the most frequent value), and a slope at the foot of a distribution curve), and the slip ratio estimated with a slip ratio estimating function 36. An experimental result shows that the slip ratio provides a smaller gain in generating fluctuations in tire rotation speed than the slip angle, and higher accuracy is sometimes obtained by estimating the slip ratio in another way, i.e., by using the slip ratio estimating function 36.

The slip ratio estimating function 36 in the above embodiment can be realized, for example, by a method of obtaining, as the slip ratio, a ratio of a measured value of the tire rotation speed to an absolute vehicle speed determined from a Doppler shift of a reflected wave produced from an electric wave transmitted to the road surface, or by a method of obtaining, as the slip ratio, a ratio between the tire rotation speeds of a target tire and another tire.

Figure 15:
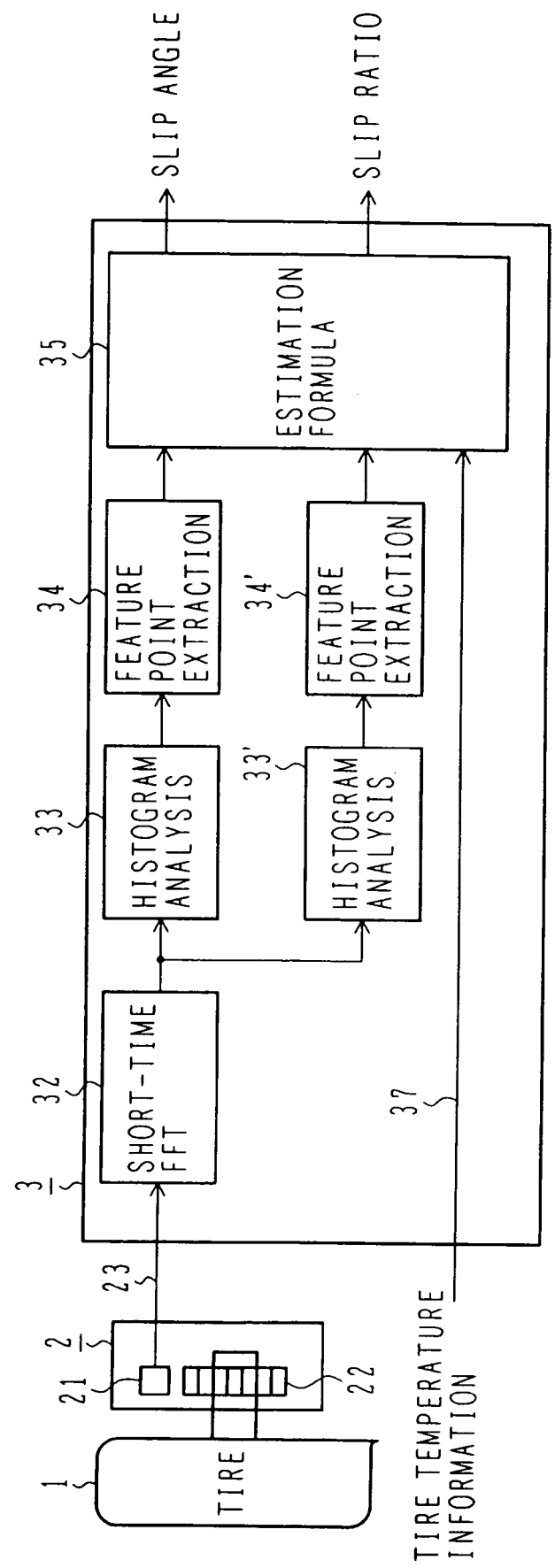
FIG. 15 is a block diagram showing an embodiment in which a slip angle and a slip ratio are estimated based on estimation formulae using estimated tire temperature information.

FIG. 15 shows an embodiment including the step of estimating the slip angle using the estimation formula 35 based on values representing the feature points extracted with the feature point extractions 34, 34' (such as an average value of the distribution, a peak (most frequent value) of the distribution, the height of the peak (incidence of the most frequent value), and a slope at the foot of a distribution curve), and tire temperature information 37. An experimental result shows that a rise of the tire temperature increases fluctuations in tire rotation speed. In this embodiment, therefore, a temperature characteristic is modified using the tire temperature information 37.

Figure 16:
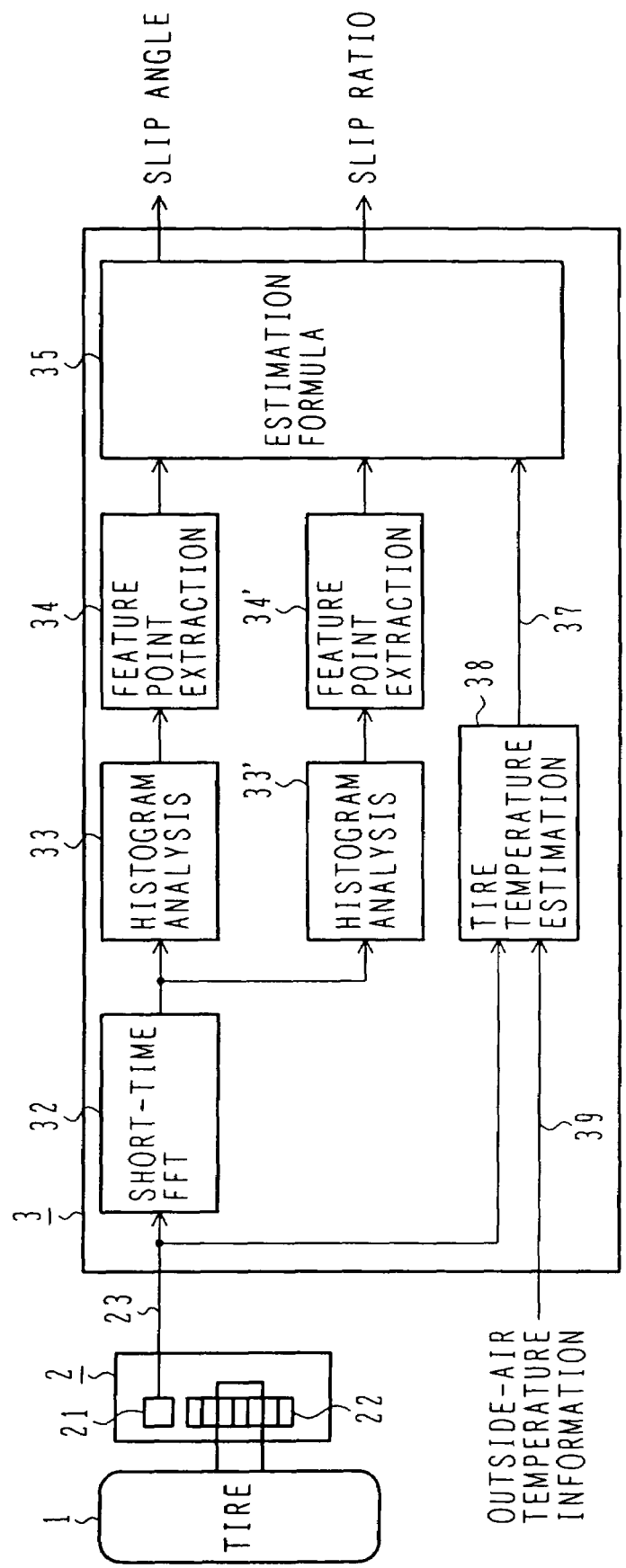
FIG. 16 is a block diagram showing another embodiment in which a slip angle and a slip ratio are estimated based on estimation formulae using tire temperature information.

Further, as shown in FIG. 16, the slip angle can also be estimated using the estimation formula 35 based on tire temperature information 37 that is estimated with a tire temperature estimating function 38. The tire temperature estimating function 38 is realized, by way of example, as follows.

First, when heat in proportion to a tire rotation speed v is applied to the tire and heat in proportion to a temperature difference with respect to an ambient temperature Ta is radiated, a change in a tire temperature T with the lapse of time is expressed by;

$$dT/dt = K1 \cdot v/C - K2(T-Ta)$$

where C: heat capacity of the tire, and K1, K2: proportional constants. By putting d/dt=s, the above formula is rewritten to;

$$T = \{K1 \cdot v/C + K2 \cdot Ta\}/(K2+s)$$

Thus, the tire temperature is expressed as a primary delay and can be estimated from the above formula.

Ta may be set to 25°, or it may be inputted as outside-air temperature information 39 from the exterior. As an alternative, because the outside-air temperature information 39 is often used as intake temperature in an engine control unit, the outside-air temperature information 39 can also be inputted from the engine control unit via separate wiring, serial communication or the like.

Figure 17:
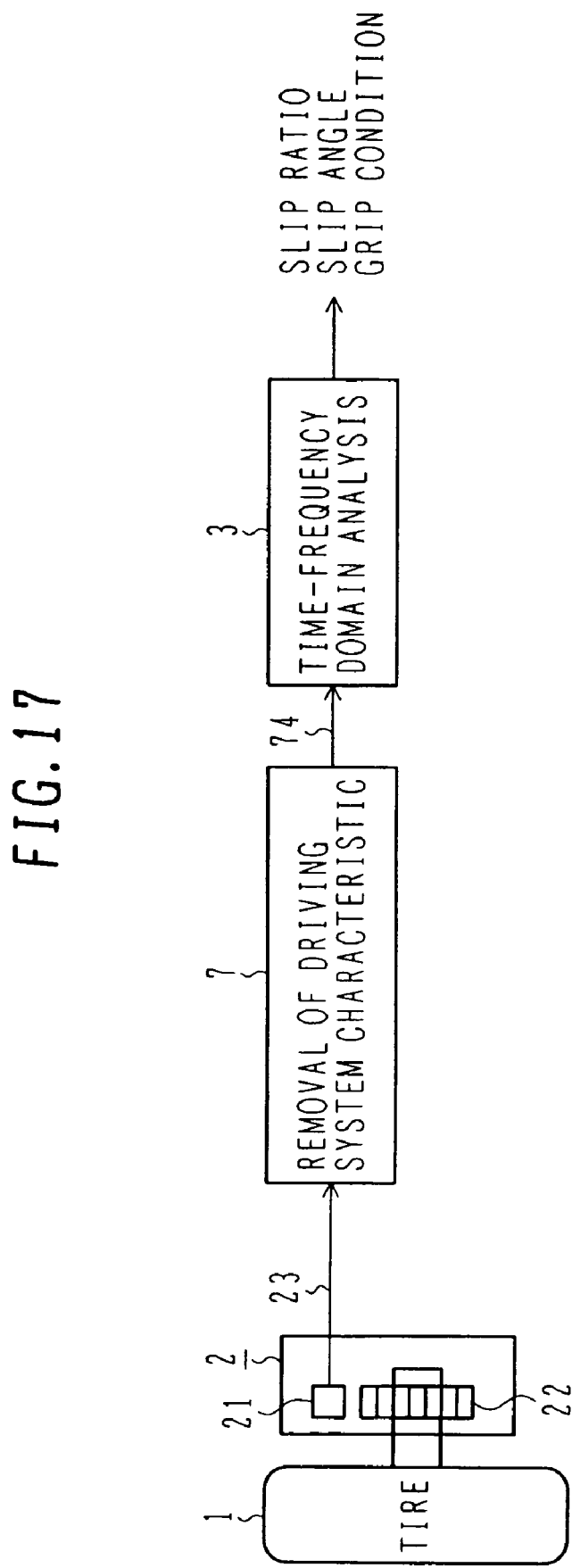
FIG. 17 is a block diagram showing an embodiment in which an analysis in the time-frequency domain is executed after removal of a tire characteristic.

FIG. 17 shows an embodiment in which the tire grip conditions, such as the slip ratio and the slip angle, are determined through the steps of producing data 74 obtained after removing a tire characteristic (tire uniformity) with a driving-system characteristic removing function 7, and executing the time-frequency domain analysis 3 on the after-removal data 74.

Note that, in this specification, a mechanism for transmitting a driving force from a prime mover, such as an engine or a motor, to tires is called a power system, and the whole including the power system and the tires is called a driving system.

Because vibrations are generated by slips in a way not continuous but intermittent, the time-frequency domain analysis 3 can be executed, for example, using the Wavelet conversion 31 shown in FIG. 4 or the short-time FFT (Fast Fourier Transform) shown in FIG. 6.

Figure 18:
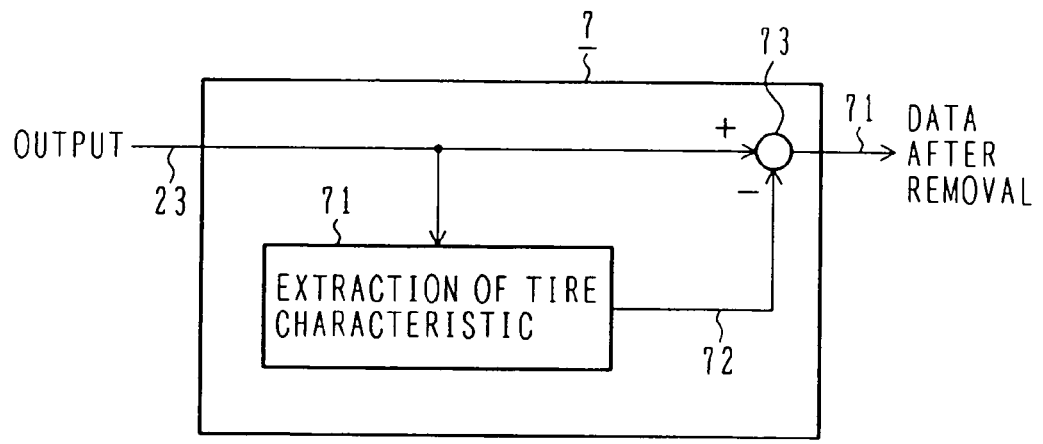
FIG. 18 is a block diagram showing an example of the function of removing a driving system characteristic.

FIG. 18 shows an example of the driving-system characteristic removing function 7. A tire characteristic extracting function 71 extracts a tire characteristic 72 from the output 23 of the tire rotation speed sensor 2, and subtracts the tire characteristic 72 from the output 23 of the tire rotation speed sensor 2 with a subtraction function 73, thereby obtaining the after-removal data 74.

With the embodiment described above, since fluctuation components of the rotation speed produced due to the tire characteristic (tire community) can be removed, it is possible to more easily detect the fluctuation components caused by tire slips, and to detect the tire grip conditions, such as the slip ratio and the slip angle, with higher accuracy.

Figure 19:
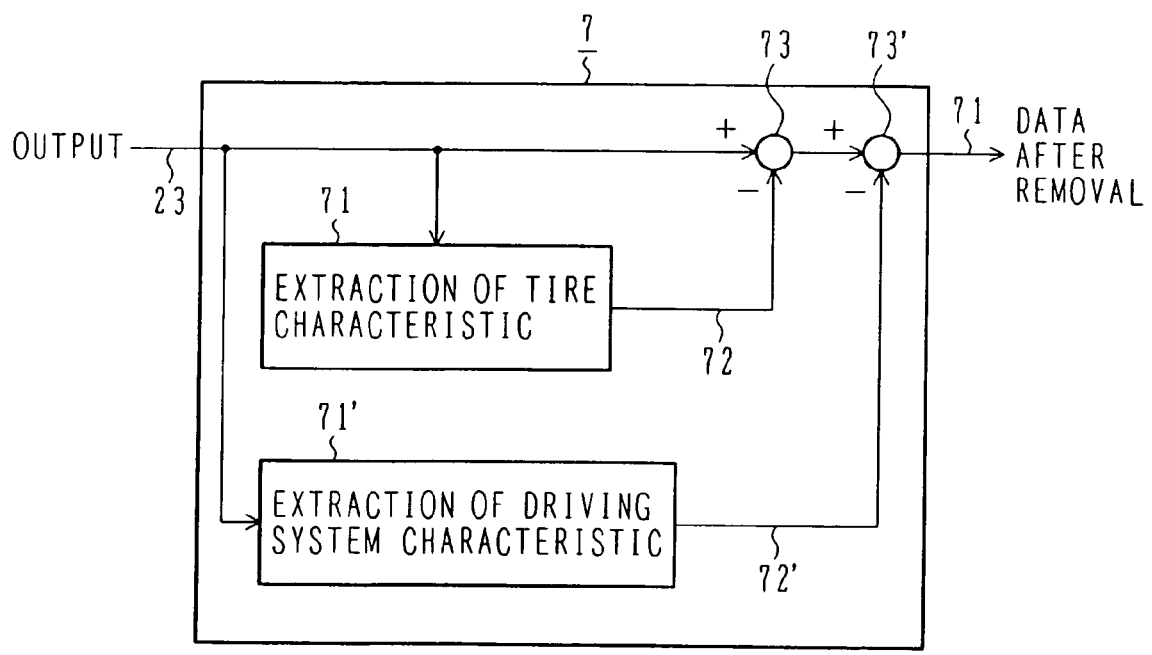
FIG. 19 is a block diagram showing an example in which the function of removing the driving system characteristic has the function of removing a power system characteristic.

Alternatively, as shown in FIG. 19, a power-system characteristic extracting function 71 may be added to extract a power system characteristic 72', and the extracted power characteristic may be subtracted from the output 23 of the tire rotation speed sensor 2 with the subtraction function 73. With this embodiment, since fluctuation components of the rotation speed produced due to the power system characteristic (power system community) can also be removed, it is possible to more easily detect the fluctuation components caused by tire slips, and to detect the tire grip conditions, such as the slip ratio and the slip angle, with even higher accuracy.

Figure 20:
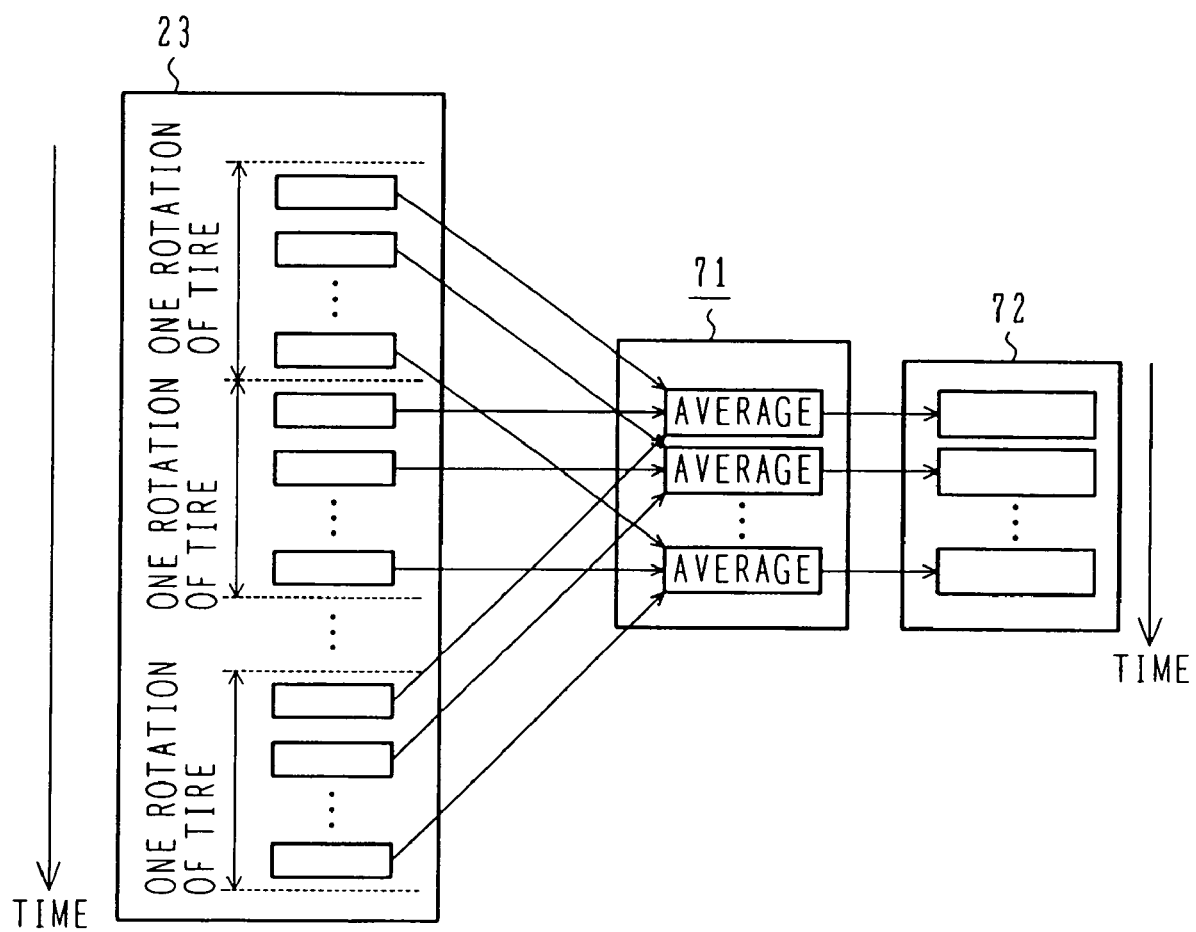
FIG. 20 is a block diagram showing an example of the function of extracting a tire characteristic.

FIG. 20 shows an example of the operation of the tire characteristic extracting function 71. The tire characteristic 72 is obtained with the tire characteristic extracting function 71 by taking in the output 23 of the tire rotation speed sensor 2 per one rotation of the tire as a cycle, and averaging passing speeds of individual teeth of the detection gear 22 or times required for passage of the individual teeth over plural revolutions of the tire. By calculating not only a simple average, but also a weighted average with a weight applied to a just preceding value rather than a past value, the latest tire characteristic can be always determined so as to follow changes in the tire characteristics with the lapse of time.

Figure 21A:
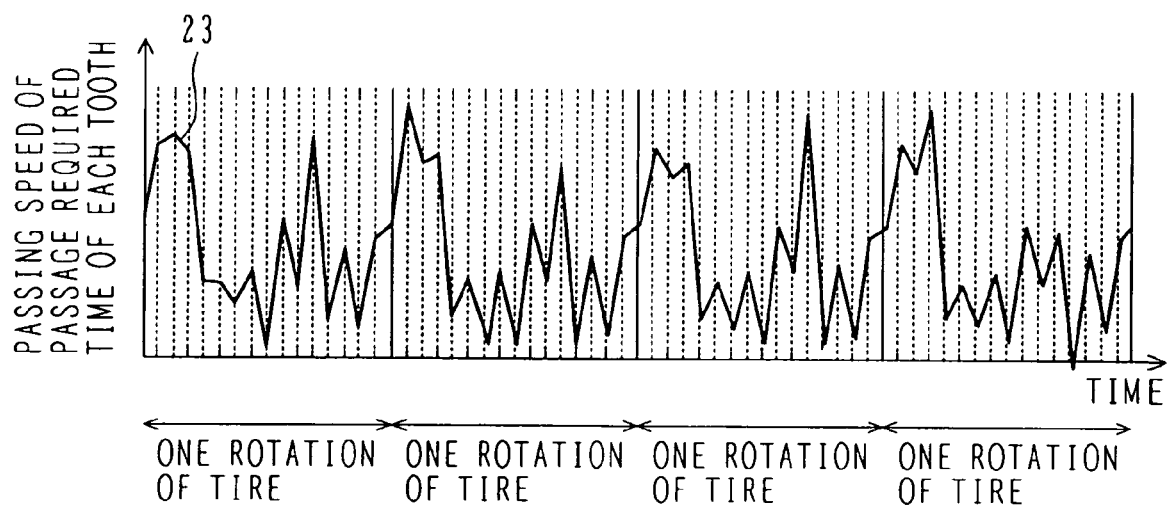
FIG. 21 is a chart for explaining the operation of the function of extracting a tire characteristic.
Figure 21B:
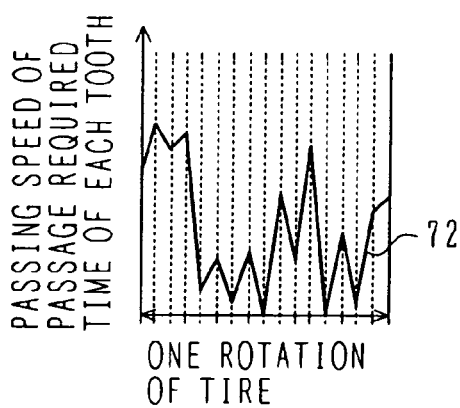

For example, when the output 23 of the tire rotation speed sensor 2 is provided as shown in FIG. 21, the tire characteristic 72 can be obtained by averaging the passing speeds of individual teeth of the detection gear 22 or the times required for passage of the individual teeth over plural revolutions of the tire. Note that, in FIG. 21, the vertical axis represents the passing speed or the passage required time of each tooth, and the horizontal axis represents time (corresponding to each tooth of the detection gear 22).

The subtraction function 73 subtracts the tire characteristic 72 from the output 23 of the tire rotation speed sensor 2 in correspondent relation to the individual teeth of the detection gear 22, to thereby obtain the after-removal data 74.

Figure 23A:
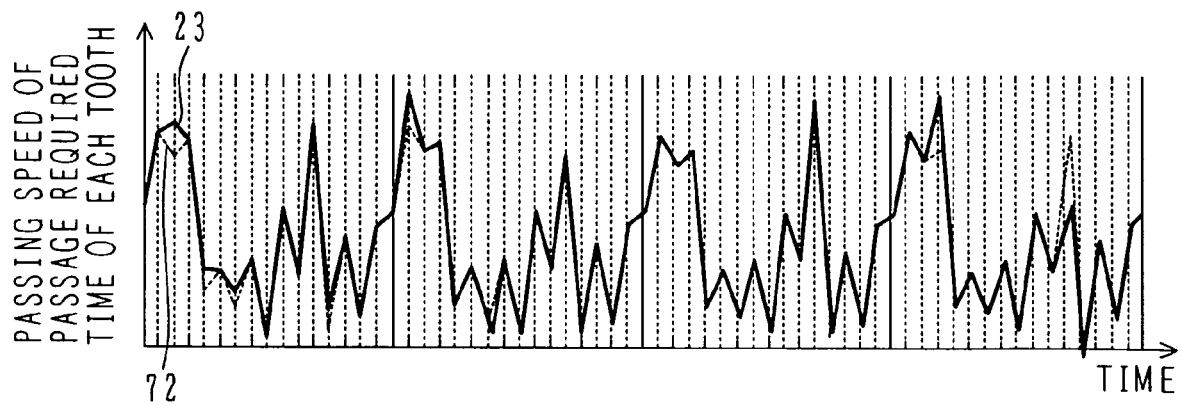
FIG. 23 is a chart for explaining the operation of the subtraction function.
Figure 23B:
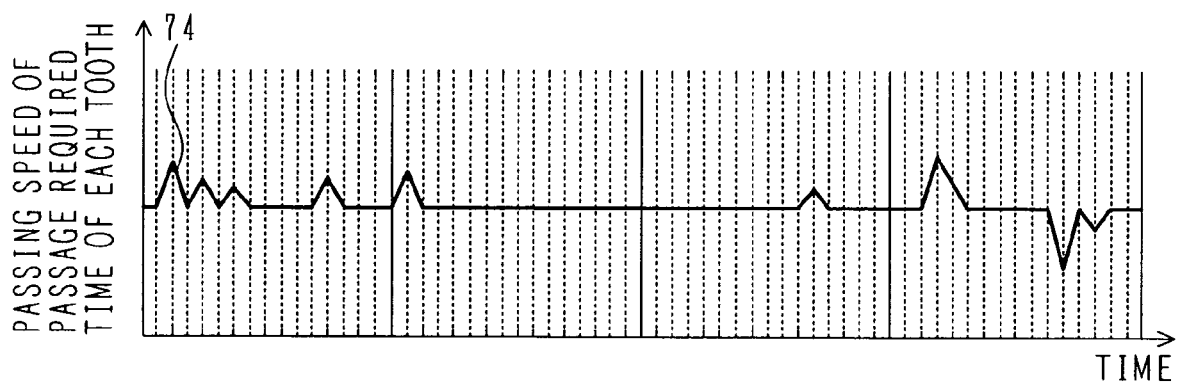

Assuming, for example, as shown in FIG. 23 that a solid line in the upper side represents the output 23 of the tire rotation speed sensor 2 and a broken line represents the tire characteristic 72, the after-removal data 74 is obtained as a difference between them as shown in the lower side.

Figure 22:
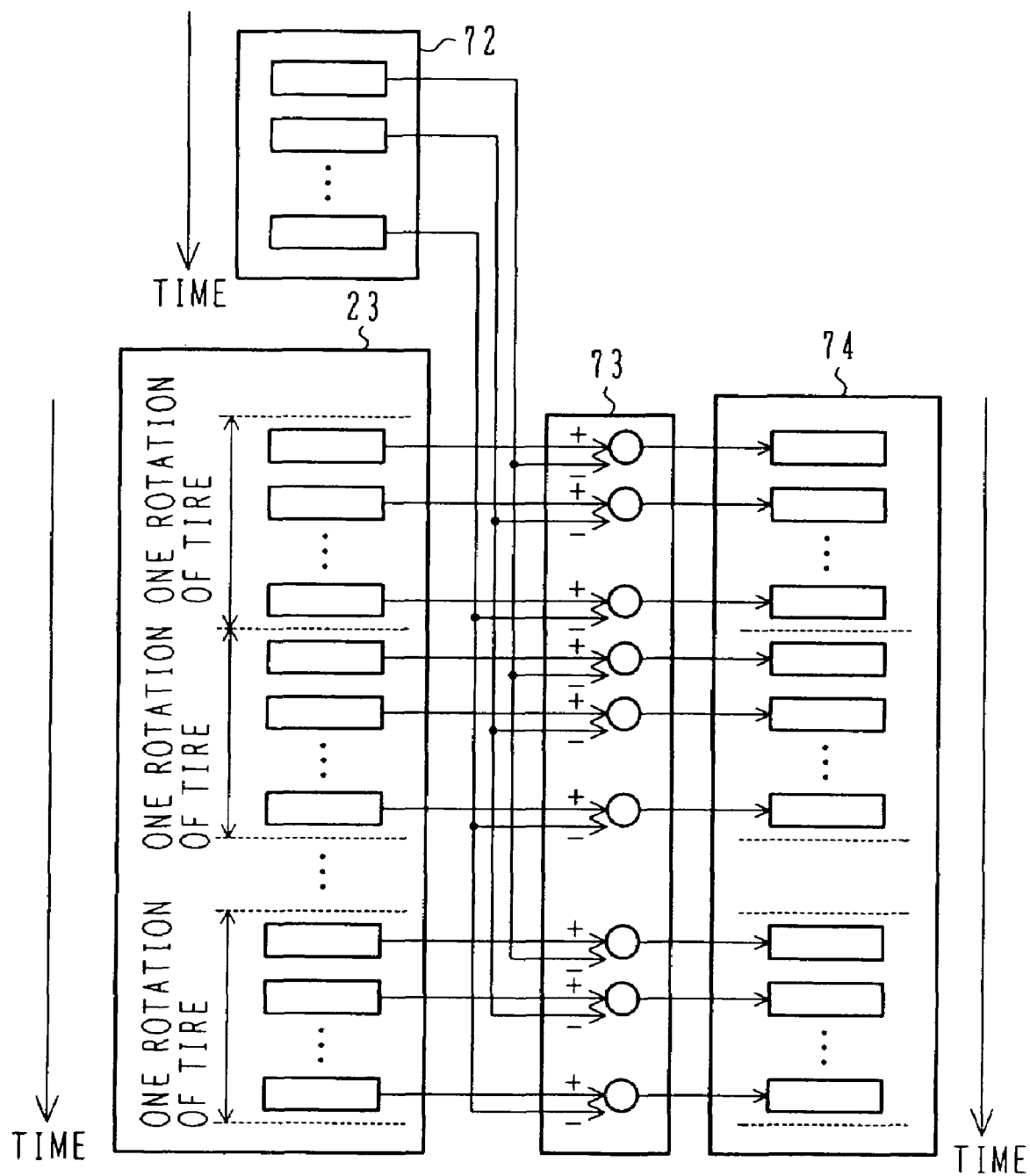
FIG. 22 is a block diagram showing an example of the subtraction function.

While the method of removing the tire characteristic 72 has been described with reference to FIGS. 20, 21 and 23, a description is now made in more detail in connection with the practical cases. When a rotation characteristic is completed for each rotation as in the case of the prime mover being a motor, the power system characteristic 72' for the motor can be removed by calculating an average or a weighted average per one rotation of the motor as a cycle, and subtracting it from the output 23 of the tire rotation speed sensor 2 for each cycle, i.e., per one rotation of the motor, as shown in FIG. 22 instead of FIG. 20. When the prime mover is a 4-cycle internal combustion engine, the engine rotates twice until all strokes of one cylinder are completed. Accordingly, the power system characteristic 72' for the 4-cycle engine can be removed by calculating an average or a weighted average per two rotations of the engine as a cycle, and though not specifically shown, subtracting it from the output 23 of the tire rotation speed sensor 2 for each cycle, i.e., per two rotation of the 4-cycle engine, in a similar manner to that shown in FIG. 22. Also, when a speed reducing mechanism has a gear ratio of M:N, the power system characteristic 72' for the speed reducing mechanism can be removed, in the case of the prime mover being a motor, by calculating an average or a weighted average per ([least common multiple of M and N]/N) rotations of the tire as a cycle in a similar manner to that shown in FIG. 20, and subtracting it from the output 23 of the tire rotation speed sensor 2 for each cycle, i.e., per ([least common multiple of M and N]/N) rotations of the tire, in a similar manner to that shown in FIG. 22. Further, in the case of the prime mover being a 4-cycle internal combustion engine, the power system characteristic 72' for the speed reducing mechanism can be removed by, though not specifically shown, calculating an average or a weighted average per (2×[least common multiple of M and N]/N) rotations of the tire as a cycle in a similar manner to that shown in FIG. 20, and subtracting it from the output 23 of the tire rotation speed sensor 2 for each cycle, i.e., per (2×[least common multiple of M and N]/N) rotations of the tire, in a similar manner to that shown in FIG. 22.

Figure 24:
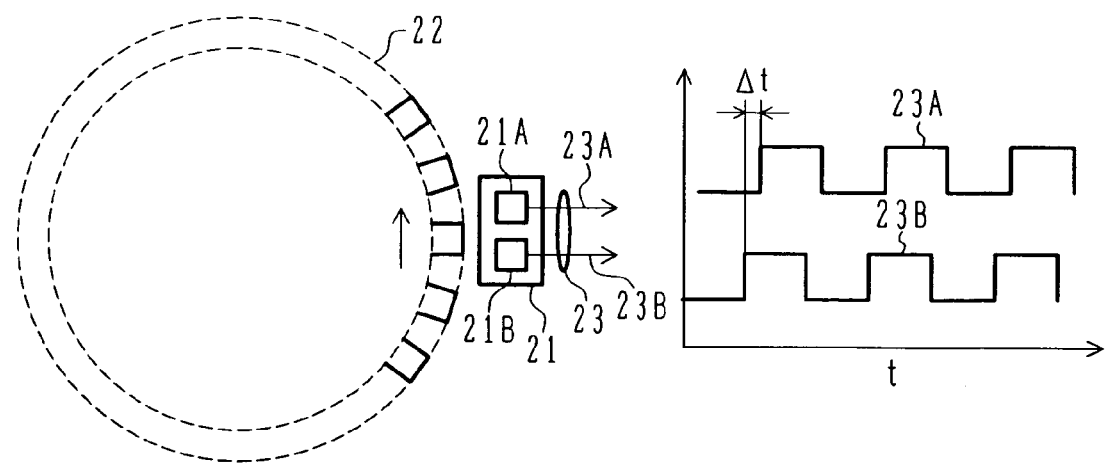
FIG. 24 is a schematic view showing an example of a rotation speed sensor.

FIG. 24 shows an example of the rotation speed sensor suitable for use in the present invention. Near the detection gear 22, two magnetic sensors 21A, 21B (both constituting the magnetic sensor 21) are disposed in spaced relation by a certain distance. When the detection gear 22 is rotated, outputs 23A, 23B of the magnetic sensors 21A, 21B are provided as signals having a time difference $\Delta t$ between them. Because this time difference $\Delta t$ is proportional to a reciprocal number of a rotation speed, the rotation speed can be calculated from the time difference $\Delta t$. In the related art, only one magnetic sensor (e.g., the magnetic sensor 21A) is disposed and the rotation speed is calculated from an interval between successive rises or falls of the output 23A of the magnetic sensor 21A. Therefore, if there is an error in teeth intervals due to an error in machining the detection gear 22, the interval between successive rises or falls of the output 23A is also varied, thus resulting in a measurement error. In contrast, with this embodiment, the rotation speed can be detected with high accuracy without being affected by the accuracy in machining the teeth of the detection gear 22. An influence of the accuracy in machining the teeth of the detection gear 22 is limited to only a variation (jitter) of sampling timing and is small.

When detecting fluctuations in rotation as in the present invention, an error of the rotation speed gives a large influence on the measurement result. Therefore, the sensor of this embodiment is preferable particularly for use in the present invention. Also, by enclosing the two magnetic sensors 21A, 21B in one package, indicated by 21, as in this embodiment, the magnetic sensor 21 can be mounted in a similar way to that used for mounting the known sensor.

Further, with the magnetic sensor 21 of this embodiment, when the driving system characteristic, e.g., the tire characteristic 72 or the power system characteristic 72', is extracted in any of the embodiments shown in FIG. 18 to 23, there occur no errors which are otherwise caused due to errors in shape specific to the detection gear 22. Accordingly, it is possible to eliminate the necessity of providing any means to remove those errors as described in JP,A 8-132831, and to estimate the tire characteristic 72 without accompanying a possibility that the components of relatively high frequency may be lost by a frequency characteristic of a filter for removing those errors.

Figure 25:
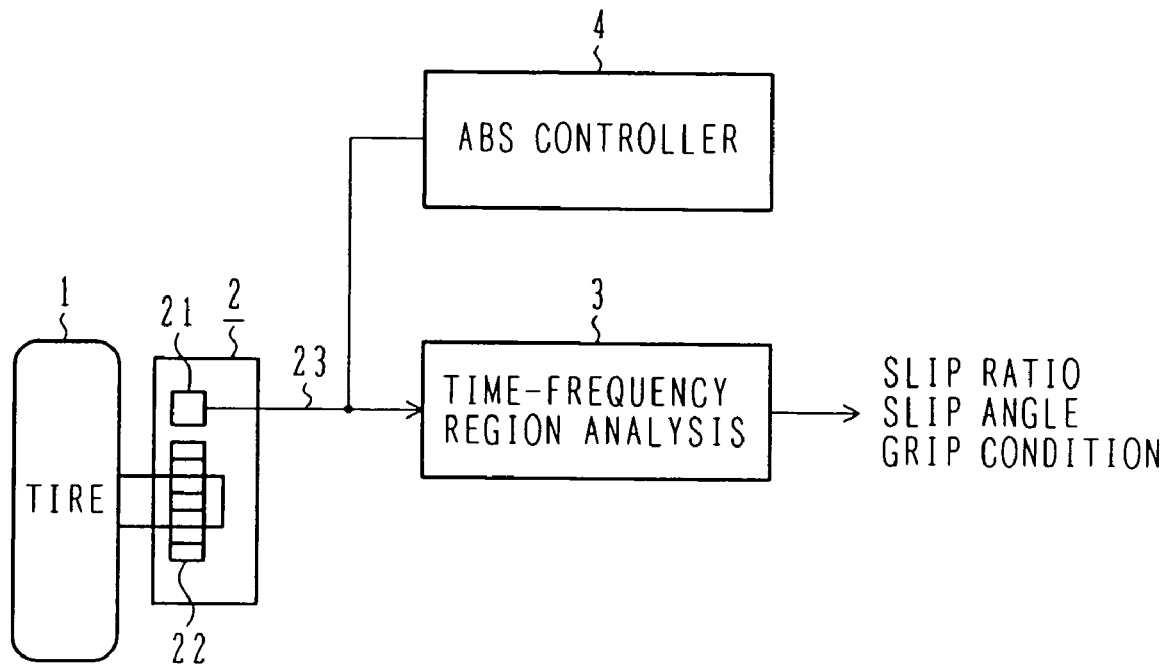
FIG. 25 is a block diagram showing an embodiment in which the rotation speed sensor is used in common with an ABS controller.

FIG. 25 shows an embodiment in which the magnetic sensor 21 is used in common with an ABS (Antilock Braking System) controller 4. By employing the output 23 of the magnetic sensor 21 in common with the ABS controller 4, the slip ratio and the slip angle of the tire can be directly measured without adding a new sensor, and hence an increase of the cost can be held down.

Figure 26:
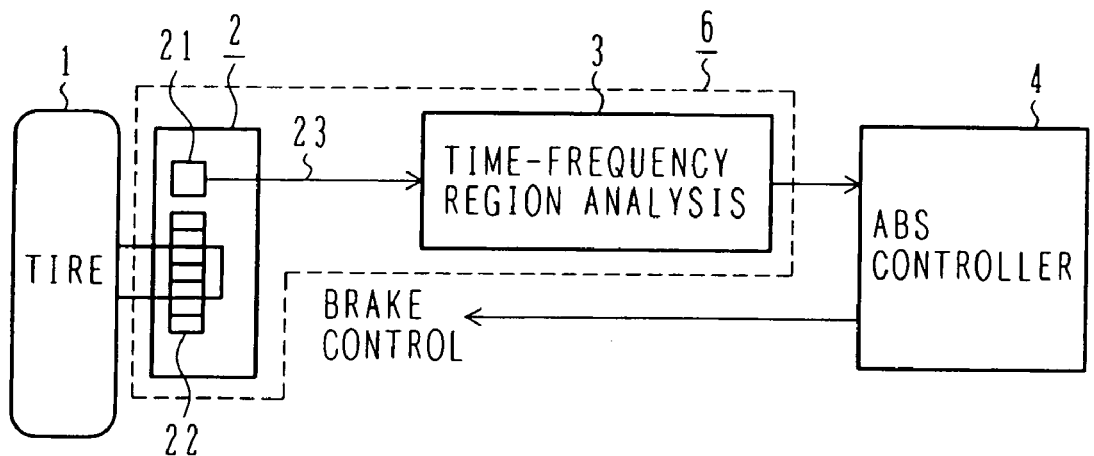
FIG. 26 is a block diagram showing an embodiment of an ABS control system.

FIG. 26 shows an embodiment of the ABS control system using a tire grip sensor 6 according to the present invention. When the slip ratio or the slip angle of the tire detected by the tire grip sensor 6 according to the present invention exceeds a predetermined value set in advance, the ABS controller 4 performs the operation for weakening a braking force that is applied to the corresponding tire, to thereby prevent skidding otherwise caused upon braking.

Figure 27:
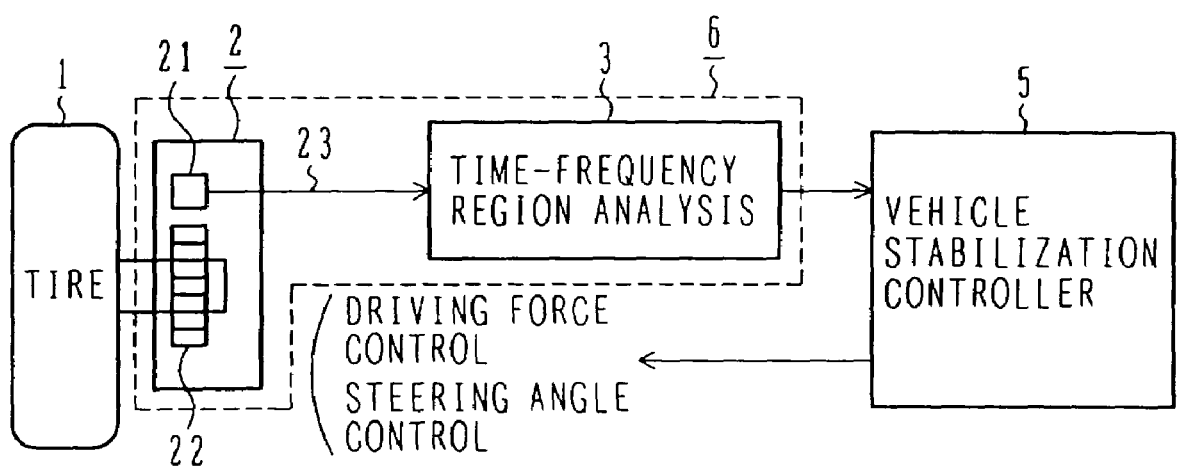
FIG. 27 is a block diagram showing an embodiment of a vehicle stabilization control system.

FIG. 27 shows an embodiment of a vehicle stabilization control system using the tire grip sensor 6 according to the present invention. When the slip ratio or the slip angle of the tire detected by the tire grip sensor 6 according to the present invention exceeds a predetermined value set in advance, a vehicle stabilization controller 5 performs the operation for weakening a driving force that is applied to the corresponding tire, to thereby prevent freewheeling of the tire. Also, when the slip ratio or the slip angle of the tire detected by the tire grip sensor 6 according to the present invention exceeds a predetermined value set in advance, a vehicle stabilization controller 5 may also perform the operation for reducing a steering angle of the corresponding tire so as to prevent skidding of the tire otherwise caused by improper steering operation.

With the embodiments shown in FIGS. 25, 26 and 27, as described above, since the tire grip conditions can be reliably detected for the purpose of control, it is possible to perform the control with high accuracy in a proper way.

Thus, the present invention is effective in detecting a tire grip force and then detecting the running state of a vehicle.

What is claimed is:

1. A tire grip sensor comprising a tire rotation speed sensor and a time-frequency domain analyzer, wherein:
    said tire rotation speed sensor is mounted to a rotating shaft of a tire;
    said time-frequency domain analyzer analyzes an output of said tire rotation speed sensor and measures tire grip conditions from feature points obtained by said time-frequency domain analyzer;
    said tire rotation speed sensor outputs pulses at a frequency in proportion to a tire rotation speed; and
    said time-frequency domain analyzer includes a process for executing Wavelet conversion.

2. The tire grip sensor according to claim 1, wherein said time-frequency domain analyzer includes a process for executing a histogram analysis of amplitude or power for a particular frequency component obtained with the Wavelet conversion, and taking the coordinates of an apex of the histogram as said feature point.

3. A tire grip sensor comprising a tire rotation speed sensor and a time-frequency domain analyzer, wherein:
    said tire rotation speed sensor is mounted to a rotating shaft of a tire;
    said time-frequency domain analyzer analyzes an output of said tire rotation speed sensor and measures tire grip conditions from feature points obtained by said time-frequency domain analyzer; and
    wherein said time-frequency domain analyzer includes a process for executing short-time fast Fourier transform.

4. The tire grip sensor according to claim 3, wherein said time-frequency domain analyzer includes a process for executing a histogram analysis of amplitude or power for a particular frequency component obtained with the short-time fast Fourier transform, and taking the coordinates of an apex of the histogram as said feature point.

5. A tire grip sensor comprising a tire rotation speed sensor and a time-frequency domain analyzer, wherein:
    said tire rotation speed sensor is mounted to a rotating shaft of a tire;
    said time-frequency domain analyzer analyzes an output of said tire rotation speed sensor and measures tire grip conditions from feature points obtained by said time-frequency domain analyzer; and
    the tire grip conditions are measured based on the feature point obtained by said time-frequency domain analyzer and information of a slip ratio.

6. A tire grip sensor comprising a tire rotation speed sensor and a time-frequency domain analyzer, wherein:
    said tire rotation speed sensor is mounted to a rotating shaft of a tire;
    said time-frequency domain analyzer analyzes an output of said tire rotation speed sensor and measures tire grip conditions from feature points obtained by said time-frequency domain analyzer; and
    the tire grip conditions are measured based on a feature point obtained by said time-frequency domain analyzer and information of tire temperature.

7. The tire grip sensor according to claim 6, wherein the tire temperature is estimated based on information of outside-air temperature.

8. A tire grip sensor comprising a tire rotation speed sensor and a time-frequency domain analyzer, wherein:
    said tire rotation speed sensor is mounted to a rotating shaft of a tire; and
    said time-frequency domain analyzer analyzes an output of said tire rotation speed sensor and measures tire grip conditions from feature points obtained by said time-frequency domain analyzer;
    said tire rotation speed sensor comprises a detection gear mounted to said rotating shaft of the tire and at least two magnetic sensors disposed near said detection gear; and
    said time-frequency domain analyzer determines, as the tire rotation speed, a value in proportion to a reciprocal number of a time difference between signals from said at least two magnetic sensors.

9. A tire grip sensor comprising a tire rotation speed sensor and a time-frequency domain analyzer, wherein:

said tire rotation speed sensor is mounted to a rotating shaft of a tire; and said time-frequency domain analyzer analyzes an output of said tire rotation speed sensor and measures tire grip conditions from feature points obtained by said time-frequency domain analyzer; wherein, said sensor has a function of removing a driving system characteristic;

the output of said tire rotation speed sensor is applied to the driving-system characteristic removing function; and the driving-system characteristic removing function removes the driving system characteristic from the applied output of said tire rotation speed sensor, and inputs the remainder to said time-frequency domain analyzer.

10. The tire grip sensor according to claim 9, wherein the driving-system characteristic removing function has a function of estimating a driving system characteristic and a subtraction function, the driving-system characteristic estimating function estimates the driving system characteristic by calculating an average or a weighted average of passing speeds of individual teeth of said detection gear or times required for passage of the individual teeth over plural revolutions of the tire with one rotation of the tire being a cycle, and the subtraction function subtracts, from the applied output of said tire rotation speed sensor, the driving system characteristic estimated by the driving-system characteristic estimating function for each of the teeth of said detection gear in corresponding relation.

11. The tire grip sensor according to claim 9, wherein the driving-system characteristic removing function has a function of estimating a driving system characteristic and a subtraction function, when a speed reducing mechanism constituting the driving system has a gear ratio of M:N, the driving-system characteristic estimating function estimates the driving system characteristic by calculating an average or a weighted average of passing speeds of individual teeth of said detection gear or times required for passage of the individual teeth over plural cycles with ([least common multiple of M and N]/N) rotations of the tire being a cycle, and the subtraction function subtracts, from the applied output of said tire rotation speed sensor, the driving system characteristic estimated by the driving-system characteristic estimating function for each of the teeth of said detection gear in corresponding relation.

12. An antilock braking system wherein:

a tire grip sensor is mounted to at least one wheel of an automobile;

when a slip ratio or a slip angle of the tire detected by said tire grip sensor exceeds a predetermined value set in advance, said antilock braking system reduces a braking force applied to the corresponding tire;

said tire grip sensor comprises a tire rotation speed sensor and a time-frequency domain analyzer;

said tire rotation speed sensor is mounted to a rotating shaft of a tire; and said time-frequency domain analyzer analyzes an output of said tire rotation speed sensor and measures tire grip conditions from feature points obtained by said time-frequency domain analyzer.

13. A vehicle stabilization control system wherein:

the tire grip sensor is mounted to at least one wheel of an automobile;

when a slip ratio or a slip angle of the tire detected by said tire grip sensor at the time of acceleration exceeds a predetermined value set in advance, said vehicle stabilization control system reduces a driving force applied to the corresponding tire;

said tire grip sensor comprises a tire rotation speed sensor and a time-frequency domain analyzer;

said tire rotation speed sensor is mounted to a rotating shaft of a tire; and said time-frequency domain analyzer analyzes an output of said tire rotation speed sensor and measures tire grip conditions from feature points obtained by said time-frequency domain analyzer.

14. A vehicle stabilization control system wherein:

a tire grip sensor is mounted to at least one wheel of an automobile;

when a slip ratio or a slip angle of the tire detected by said tire grip sensor exceeds a predetermined value set in advance, said vehicle stabilization control system reduces a steering angle of the corresponding tire;

said tire grip sensor comprises a tire rotation speed sensor and a time-frequency domain analyzer;

said tire rotation speed sensor is mounted to a rotating shaft of a tire; and said time-frequency domain analyzer analyzes an output of said tire rotation speed sensor and measures tire grip conditions from feature points obtained by said time-frequency domain analyzer.

* * * * *